Oct. 19, 1926.
E. L. PECK
SAMPLING DEVICE
Filed Feb. 3, 1922
1,603,712
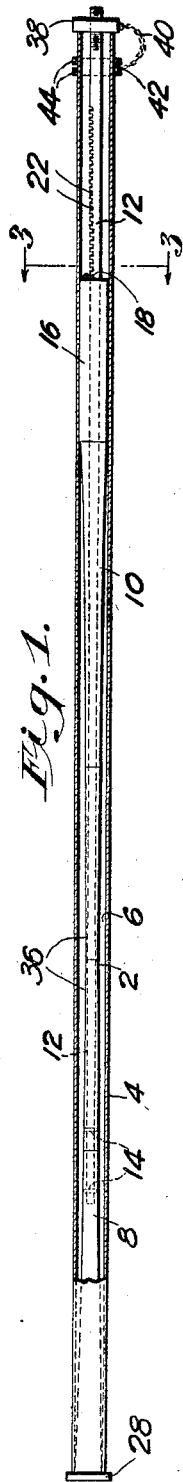
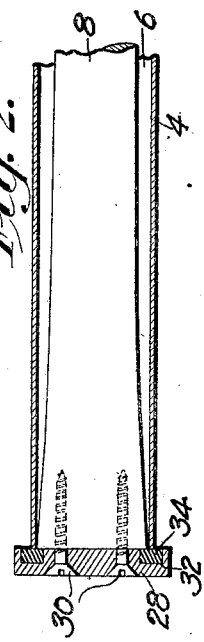
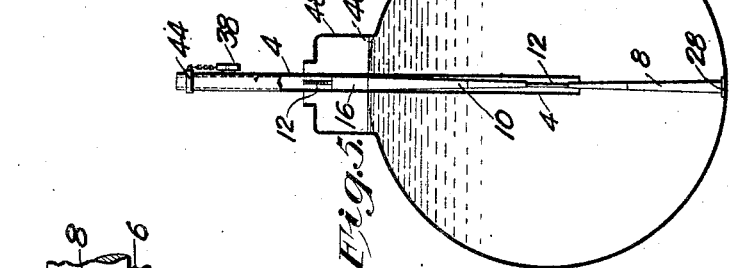
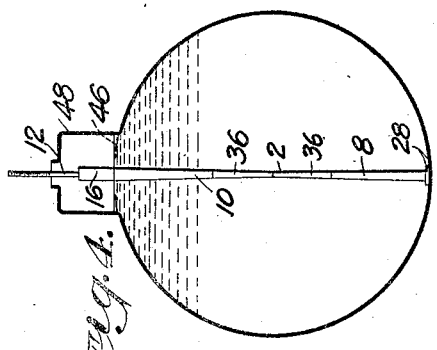
Edward L. Peck Inventor
By His Attorney
Edmund G. Borden Patented Oct. 19, 1926.

1,603,712

UNITED STATES PATENT OFFICE.

EDWARD L. PECK, OF BARTLESVILLE, OKLAHOMA, ASSIGNOR TO DOHERTY RESEARCH COMPANY, OF NEW YORK, N. Y., A CORPORATION OF DELAWARE.

SAMPLING DEVICE.

Application filed February 3, 1922. Serial No. 534,001.

This invention relates to sampling devices. The preferred embodiment of the invention is particularly designed for use in sampling petroleum oils and is of the nature of what is known in the petroleum oil industry as an "oil thief."

In dealing with petroleum oil, it is frequently necessary to measure quantities of oil and to determine their quality. The oil is generally stored in tanks, and the quantity of oil in a tank may be roughly ascertained by determining its depth. The volume of the oil in a tank, however, varies materially with variations in its temperature. In order, therefore, to determine accurately the quantity of oil in a tank, it is necessary that the quantity determination be corrected for the temperature factor.

In determining the quality of a body of oil various physical properties of the oil are taken into consideration, important among these being its specific gravity.

The character of a quantity of oil in a container usually varies considerably throughout the body of oil. For example, the specific gravity of the oil near the surface of the oil body is generally less than that of the oil at the bottom of the body. The temperature of the oil may also vary considerably in various portions of the oil body. Consequently, in order to measure the oil accurately and to arrive at a true estimate of its quality, the entire body of oil must be considered as a whole.

Thus the operations of determining quantity and quality of oil make it very necessary that a truly representative sample be obtained of the entire body of oil. By examination of such a sample, the character and condition of the body of oil considered as a whole may be determined.

Devices in present use for taking samples of oil operate in accordance with two methods; first, that of combining a number of true samples taken at different depths in the oil and, second, that of obtaining an average sample through the oil in a continuous operation. Devices which act in accordance with the second method generally comprise elongated containers provided with an opening for the admission of oil into them. In the use of the devices, they are moved at such a rate as to cause them to be filled at the end of their traverse through the body of oil. The degree to which samples taken in accordance with the first method are representative of the whole body of oil depends upon the number of samples taken and on the points in the tank from which they are obtained, whereas, in the taking of samples according to the second method, the personal equation is very important, since the accuracy of the sample depends upon the manner in which the sampling device is moved through the body of oil.

In the present practice of taking samples the sectional area of the container is assumed to be constant no matter what type of "oil thief" is used in taking the sample. Samples, however, are frequently taken from tank cars and other containers, the cross-sectional area of which is not constant throughout the depth of the container. Tank cars, for example, usually comprise cylindrical vessels arranged with their main axes in horizontal positions. Consequently, equal quantities of oil will occupy a much greater depth at the top or bottom of a tank car than in the middle of the car. If the oil at different levels in a tank car is of varying character and if in taking a sample of oil from the car equal quantities of oil are taken at all depths in the car, the sample will not, therefore, be a truly representative one but will contain a disproportionately large amount of oil from the top and bottom of the car as compared with the amount of oil taken from the middle of the car.

An object of this invention is to provide a sampling device by which samples may be taken without the exercise of any special degree of care or skill on the part of the person taking the sample, and which will enable a truly representative sample to be taken from a tank car or other container of varying cross-sectional areas. To this end an important feature of the invention resides in the provision of members co-acting with each other to take from a container at any depth an amount of material proportional to the cross-sectional area of the container at that depth.

A further feature of the invention resides in the provision of a member having its outer surface shaped in accordance with a cross-section of the container to be sampled and a second member constructed to fit over the first mentioned member and to confine a sample of the contents of the container between the members.

In accordance with a still further feature of the invention, the sampling device comprises a member adapted to be inserted by itself into a container and means constructed to be subsequently assembled with the member to confine a sample in the device.

Other objects and features of the invention will appear as the description proceeds and will be pointed out in the appended claims.

In the drawing which illustrates a preferred embodiment of the invention;

Fig. 1 is a view in longitudinal section of a device especially designed for sampling oil in tank cars;

Fig. 2 is a view in longitudinal section and on an enlarged scale of the lower portion of the device;

Fig. 3 is a view in transverse section taken on the line 3—3 of Fig. 1;

Fig. 4 shows the inner core of the device inserted in a tank car the contents of which are to be sampled;

Fig. 5 is a view similar to Fig. 4, but showing the inner core adjusted to a tank of larger size and having the outer cylindrical tube partially placed in position over it;

Fig. 6 is a view similar to Fig. 5, but showing the outer cylindrical tube in fully lowered position so as to confine a sample of oil between itself and the inner core.

The illustrated construction comprises a solid inner core 2 enclosed in an outer cylindrical tube 4 and shaped to provide an annular chamber 6 between it and the tube 4. The device may be made applicable to a container of any shape by providing a core 2 of a shape bearing a definite proportion to the shape of the container. As already indicated, the illustrated device is particularly designed for use in sampling oil in tank cars. Accordingly, the core 2 is so shaped as to cause the chamber 6 between it and the cylindrical tube 4 to vary in area from one end to the other in the same ratio as the area of a tank car varies from the top to the bottom of the car.

For convenience in manufacture and to enable the device to be adjusted for tank cars of different sizes the core 2 is preferably made in sections. As shown, it comprises a lower portion 8 and an upper portion 10, both of which are of substantially frusto-conical form. Extending from the small end of the portion 8 is a rod or stem 12, upon which the portion 10 is slidably mounted. The rod 12 is received in a bore in the small end of the portion 8 and is secured to it by rivets 14 or other suitable means. The portion 10 exclusive of a cylindrical extension 16 constructed to fit within the cylindrical tube 4 has substantially the same shape and dimensions as the portion 8. The extension 16 conduces to ease of operation and adjustment of the device and provides a convenient means for preventing the escape of oil from the chamber 6 to the upper end of the tube 4.

The portion 10 of the core is adapted to be secured on the rod 12 in various positions of adjustment with relation to the portion 8. As shown, this may be effected by a latch 18 pivoted on a pin 20 carried by the extension 16 of the core 2. The latch 18 is arranged to co-act with notches 22 on the rod 12 and is slotted at its free end to engage over a second pin 24 on the extension 16.

The lower end of the lower portion 8 of the core 2 is provided with a disk 28 secured thereto by screws 30. The disk 28 is formed with an annular channel 32 which receives a packing ring or washer 34. When the device is assembled the lower edge of the tube 4 contacts with the packing ring 34 to provide a fluid-tight joint which prevents the escape of oil from the device.

The inner core 2 may be made of any suitable material such as wood or metal. In case it is made of wood the small ends of the portions 8 and 10 are preferably reinforced by metal ferrules 36. As shown, the inner core 2 is made solid. Manifestly, however, if found desirable for the sake of economy in manufacture or of convenience in manufacture or use, the core 2 may be constructed otherwise than as a solid member without departing from the principles of the invention. For example, the core 2 may be made hollow providing it is formed to present an unbroken outer surface.

The rod 12 of the inner core 2 is threaded on its free end to receive a knurled nut 38. When the core 2 and the outer tube 4 are assembled, the nut 38 may be turned down against the upper edge of the tube 4 thereby pressing the lower edge of the tube tightly against the washer 34. As shown, the nut is attached to the tube 4 by a chain 40 one end of which is secured to an anchor 42 riding in a channel formed between two annular flanged rings 44 on the tube 4. The invention is in no way limited to the use of a nut for tightening the tube 4 against the washer 34, since this function may be performed by other mechanisms which will readily suggest themselves to a mechanic skilled in the art.

In the use of the device the inner core 2 is first inserted by itself into the tank car or other container, the contents of which are to be sampled. The outer tube 4 is then placed over the inner core and pressed down tightly against the packing 34 by the nut 38. As shown in Fig. 4 the combined length of the frusto-conical portions 8 and 10 of the inner core exclusive of the extension 16 is exactly equal to the depth of the material compartment of the tank. Consequently, when the core is placed in the tank the base line of the portion 10, by which is meant the line between the main body of the portion 10 and the cylindrical extension 16, coincides with the top of the tank. The tops of the tanks in Figs. 4, 5 and 6 are indicated by broken lines 46 at the bottoms of the domes 48.

The base line of the upper portion 10 of the core 2 marks the top of the chamber 6 of the sampling device. It follows, therefore, that when the base line of the portion 10 is aligned with the top of the tank, the chamber 6 is of a length equal to the depth of the tank. Moreover, inasmuch as the core 2 is so formed as to cause the chamber 6 to vary in area from one end to the other in the same ratio as the area of the tank varies from the top to the bottom, it is evident that the core 2 and the cylindrical tube 4 will confine between them a truly representative sample of the entire body of the oil in the tank.

In using the device to obtain a sample from a larger tank such as that shown in Figs. 5 and 6, the upper portion 10 of the inner core 2 is raised from the lower portion 8 so as to register its base line with the top of the tank. The effect of thus raising the upper portion 10 is to extend the sample containing chamber 6 of the sampling device so as to make it always equal in length to the depth of the material compartment of the tank. When the inner core 2 of the device is thus adjusted, the central portion of the chamber 6 is of uniform cross section for a distance determined by the extent to which the portions 8 and 10 of the inner core 2 are separated. It will be noted, however, that so long as the members 8 and 10 are not separated to any great extent, the representative character of the sample is not appreciably affected, inasmuch as the cross-sectional areas of the tank vary but little in its central portion as compared, for example, with the variations in area adjacent to the top and bottom of the tank.

The illustrated device is designed to take a sample from a tank car or other container having a diameter between six feet, five inches and seven feet, two inches. Within these limits it is found that the device will take a sample which will be sufficiently representative to fulfill all commercial requirements. For tank cars of smaller diameter than six feet, five inches, a device having a shorter inner core would preferably be used, and for cars of a larger diameter than seven feet, two inches, it might be advisable, in order to get a more truly representative sample, to use a device in which the portions 8 and 10 of the inner core are of increased length. In any case, the radii of the portions 8 and 10 at their ends would preferably be unchanged.

It will be understood from the foregoing that the device of this invention requires the exercise of little care or skill for its successful use. Furthermore, it not only enables a truly representative sample to be taken from a tank car or the like, but it also permits a sample to be obtained very quickly and with practically no disturbance of the oil prior to the confinement of the sample in the device. A sample obtained by the use of the device may, therefore, be employed not only in determining the quality of the oil in a commercially accurate fashion, but also in ascertaining the true average temperature of the oil so as, for example, to provide a basis on which the volume of the oil in the tank may be corrected for the temperature factor.

Having fully described the invention what is claimed is:

1. In a device for taking a sample of material from a container of varying cross-sectional areas, a member adapted to be inserted into the container and means co-acting with said member for taking from the container at any depth an amount of material substantially proportional to the cross-sectional area of the container at that depth.

2. In mechanism of the class described, a container of varying cross-sectional areas and means for withdrawing from different points in the container amounts of material proportional to the cross-sectional areas of the container at such points.

3. A sampling device comprising a member adapted to be inserted in a container and means co-acting with said member for taking less amounts of material from the top and bottom parts of the container as compared to the central part thereof.

4. In a device for taking a sample of material from a container varying in parallel planes as to its cross-sectional areas, a member shaped in accordance with a cross-section of the container in a plane transverse to the first-mentioned planes, and means co-acting with said member for confining a sample of material in the device.

5. In a device for taking samples of material from a container varying in parallel planes as to its cross-sectional areas, a member having its outer surface shaped in accordance with a cross-section of the container in a plane transverse to the first-mentioned planes, and a second member constructed to fit over the first-mentioned member and to confine a sample of material between itself and the first-mentioned member.

6. In a device for taking samples of material from a container of varying cross-sectional areas, a member adapted to be inserted in the container and having its outer dimensions at different portions of the member inversely proportional to the cross-sectional areas of the container at the points occupied by such portions when placed in the container, and a hollow member of substantially uniform bore constructed to fit over the first-mentioned member to confine at different points in the device amounts of material directly proportional to the cross-sectional areas of the container at the points occupied by said portions of the device.

7. In a device of the class described, a member comprising two truncated conical portions having their small ends in juxtaposition and a hollow member constructed to fit over the first-mentioned member.

8. In a device for removing samples of material from a container, an outer member and a plurality of elements contained in the outer member and adjustable with respect thereto in accordance with the size of the container, said member and said elements being so constructed and arranged that adjustment of said elements with respect to said member varies the cross section of the space between the elements and outer member at a given level.

9. In a device last described, mechanism constructed to provide an elongated chamber, means for varying the length of said chamber so that the chamber may be made of a length substantially equal to the depth of material compartment of the container to be sampled and means whereby the cross section of said chamber at a given distance from the mid level thereof is varied when the length of the chamber is changed.

10. A sampling device comprising an outer and an inner member forming a chamber, said members being adjustable with relation to each other, and said members being so constructed and arranged that relative adjustment of said members varies the cross section of said chamber at a given distance at each side of its mid level.

11. In a device for removing samples of material from a container, an outer member, and an inner member constructed to form with the outer member an elongated chamber equal in length to the depth of the material compartment of the container, said inner member being composed of separate elements movable from or toward each other to increase or decrease the length of the chamber of the device in order to adapt the device for use in a container having a material compartment of greater or less size than the container previously sampled.

12. In a device for removing samples of material from a container, an outer member, and an inner member constructed to form with the outer member an elongated chamber equal in length to the depth of the material compartment of the container to be sampled, said inner member being composed of truncated cone portions, one of which is mounted for movement relatively to the other in order that the base of the movable portion may be registered with the top of the material compartment of the container so as to adapt the device for use in containers of varying sizes.

13. In a device of the class described, an inner member comprising a conical portion, a stem extending from the small end of the conical portion and a second conical portion slidably mounted on the stem with its small end arranged in juxtaposition to the small end of the first-mentioned conical portion in different positions of adjustment on the stem, and a hollow member constructed to fit over the inner member and to confine a sample of material between itself and the inner member.

14. In a device of the class described, an inner member comprising a conical portion, a stem extending from the small end of the conical portion and having notches formed in it adjacent to its free end, and a second conical portion slidably mounted on the stem with its small end arranged in juxtaposition to the small end of the first-mentioned conical portion, a latch adapted to co-operate with said notches to secure the second conical portion in different positions of adjustment on the stem, a hollow member constructed to fit over the inner member and to confine a sample of material between itself and the inner member, and means for securing the hollow member in position on the inner member.

15. A device for taking samples of material from a container of varying cross-sectional areas comprising sample confining members formed to provide a sample containing chamber having a length substantially equal to the depth of the material compartment of the container and varying in cross-sectional area from one end to the other in substantially the same ratio as the cross-sectional area of the material compartment of the container varies from the top to the bottom of the container.

16. A sampler comprising an outer casing and an inner member of different cross-section at different levels and so constructed and arranged that the effective cross-section of the sampler is co-ordinated with that of the receptacle at all levels.

17. The method of sampling materials comprising inserting a member into the material to be sampled, passing a hollow member into said material and around said first member to trap a sample of said material between them, then connecting said members in a manner to prevent the flow of material from between said members, and withdrawing said members from the material.

In testimony whereof I affix my signature.

EDWARD L. PECK.